United States Patent [19]

Hoeptner III et al.

[11] Patent Number: 4,890,644
[45] Date of Patent: Jan. 2, 1990

[54] MULTIPLE MODE METERING VALVE

[75] Inventors: Herbert W. Hoeptner III; Casey M. Hoekstra, both of Morgan Hill, Calif.

[73] Assignee: Custom Chrome, Inc., Morgan Hill, Calif.

[21] Appl. No.: 334,204

[22] Filed: Apr. 6, 1989

[51] Int. Cl.⁴ .................................... F16K 11/067
[52] U.S. Cl. .................... 137/625.41; 137/590; 137/615
[58] Field of Search ............. 137/590, 625.41, 615

[56] References Cited

U.S. PATENT DOCUMENTS

| | | | |
|---|---|---|---|
| 1,478,189 | 12/1923 | Todd | 137/590 |
| 1,521,817 | 1/1925 | Jerdone Jr. | |
| 1,605,619 | 11/1926 | Schreiner | |
| 1,678,377 | 7/1928 | Brotz | 137/615 X |
| 3,137,314 | 6/1964 | Woodhall | |
| 4,250,921 | 2/1981 | Pingel et al. | |

Primary Examiner—Alan Cohan
Attorney, Agent, or Firm—William W. Haefliger

[57] ABSTRACT

Valve apparatus for controlling flow of fluid via one or the other of two inlets defined by said apparatus, and via one or the other of two outlets defined by said apparatus, includes: a body defining a cavity; and a rotor defining porting, and rotatable in the cavity between a first position in which porting in the rotor communicates between one of the inlets and one of the outlets, and a second position in which porting in the rotor communicates between the other of the inlets and the other of the outlets; and an annular collector extending about the rotor and having an annular plenum with a discharge opening, the plenum adjustably rotatable about the rotor to angularly orient the discharge opening; the body having a through passage remaining in communication with the annular plenum as the annular collector is adjustably rotated, the through passage selectively alignable with one of the outlets in the first position of the rotor, and selectively alignable with the other of the outlets in the second position of the rotor. Also, a clamp nut is adjustable on the body to allow rotary adjusting of the collector, and a handle to rotate the rotor is connected to the rotor via an opening through the collector.

16 Claims, 3 Drawing Sheets

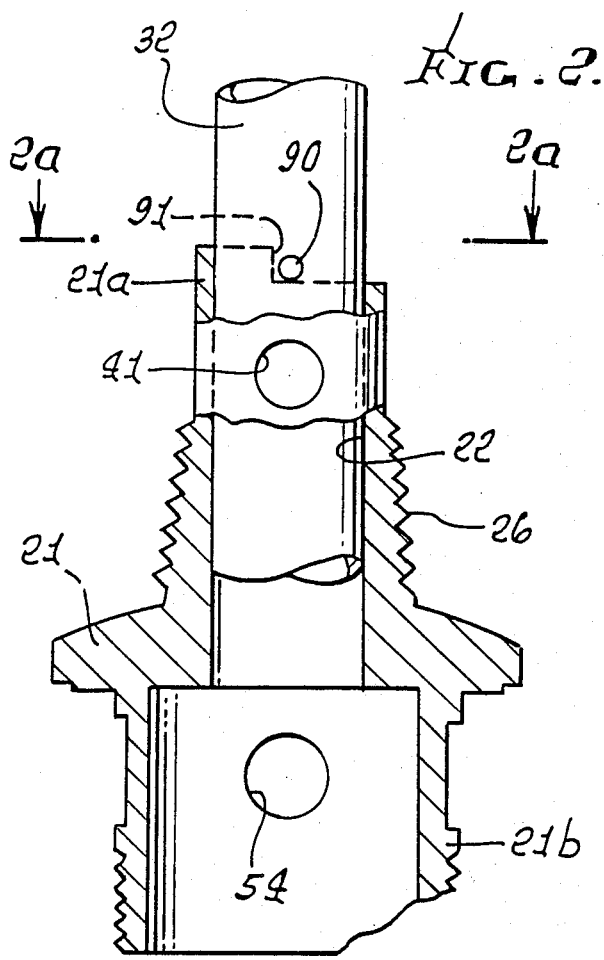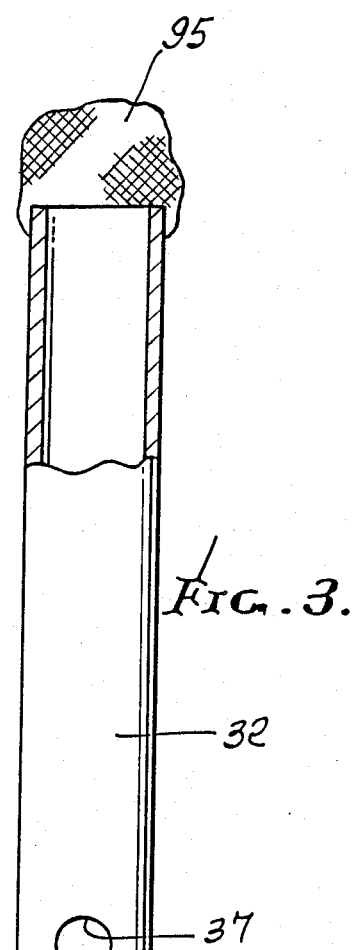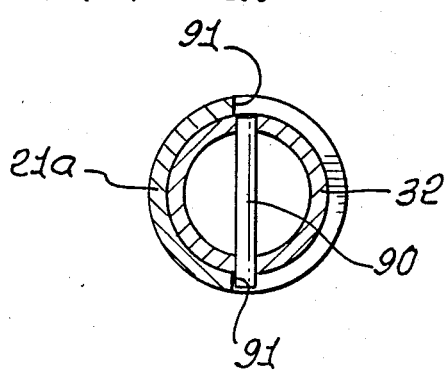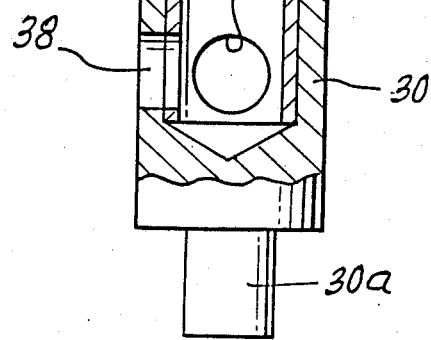

MULTIPLE MODE METERING VALVE

BACKGROUND OF THE INVENTION

This invention relates generally to valve apparatus operable in different modes to control fluid flow via different inlets to a discharge such as a nozzle; and more particularly, it concerns an improved valve which is highly reliable, and allows discharge nozzle rotary adjustment, relative to the valve itself.

Considering the requirements for fluid fuel tanks as used on different motorcycles, there is need for fuel valve apparatus which selectively accommodates its discharge nozzle orientation relative to motorcycle forward and rearward orientation. Such valve apparatus is also desirably required to meter fuel from main and reserve fuel levels in a tank or tanks, to such a discharge nozzle, whatever its orientation. However, the capability for these various modes of operation or functions is difficult to achieve in simple apparatus employing a minimum number of parts while at the same time requiring sealing against leakage.

SUMMARY OF THE INVENTION

It is a major object of the invention to provide improved valve apparatus for controlling flow of fluid via one or the other of two inlets, and via one or the other of two outlets, to a discharge opening defined by the apparatus. As will be seen, the apparatus includes:

(a) body means defining cavity means; and rotor means defining porting, and rotatable in the cavity means between a first position in which porting in the rotor means communicates between one of the inlets and one of the outlets, and a second position in which porting in the rotor means communicates between the other of the inlets and the other of the outlets, (b) an annular means extending about the rotor means and having an annular plenum with a discharge opening, the plenum adjustably rotatable about the rotor means to angularly orient the discharge opening, (c) the body means having a through passage remaining in communication with the annular plenum as the annular means is adjustably rotated, the through passage selectively alignable with on of the outlets in the first position of the rotor means, and selectively alignable with the other of the outlets in the second position of the rotor means.

As will be seen, these outlets are typically on the rotor means; and the rotor means typically includes an axially elongated tubular stem on which the two inlets are located in offset relation axially. The stem may extend upright, and into a tank for the fluid, and the discharge outlet as may be defined by a nozzle may be selectively oriented, angularly relative to the tank, and relative to a vehicle such as a motorcycle that includes or carries that tank. For this purpose, clamp means is advantageously provided to clamp the annular means in position relative to the body means, after adjusted rotation of the annular means about an axis of rotation defined by the rotor means.

Another object involves provision of the rotary means to define an axis of rotation, the two outlets located in approximately 90° offset relation, about the axis, to be selectively registrable with the through passage.

Further, warped O-ring means is typically provided to include a first warped O-ring engaging a bore defined by the body means, and adjacent the through passage, the first warped O-ring extending about a transverse axis defined by the through passage, the transverse axis extending transversely relative to an axis of rotation defined by the rotor means, the bore extending about the axis of rotation. Also, the warped O-ring mean may include a second warped O-ring engaging the bore, the two O-rings located at opposite sides, respectively, of the axis of rotation, whereby rotor rotation is balanced.

Additional objects include provision of a handle operatively connected to the rotor means to rotate same between said positions, and a clamp carried by said apparatus to adjustably clamp the said annular means in selected rotary position on and relative to the body means; and the clamp including an annular nut having thread connections to the body means, and said handle is connected to a part of said rotary means which projects through the nut.

These and other objects and advantages of the invention, as well as the details of an illustrative embodiment, will be more fully understood from the following specification and drawings, in which:

DRAWING DESCRIPTION

FIG. 2 is a vertical section taken through the valve body;

FIG. 2a is a section on lines 2a—2a of FIG. 2;

FIG. 3 is a section taken through a rotary tubular stem;

DETAILED DESCRIPTION

As referenced above, the invention relates generally to multiple mode metering valves, and more particularly, to valve apparatus for controlling flow of fluid (such as fuel) via one or the other of two inlets defined by the apparatus, and via one or the other of two outlets also defined by the apparatus. It satisfies need for reliable and simple metering valve apparatus which will meter the flow of fuel from a tank means down to a reserve level, and then, after adjustment, meter flow of fluid from the tank means below the reserve level. When applied to a vehicle, such as a motorcycle, this arrangement allows the rider or user to be warned that the main portion of fuel is used up, and he then can switch the valve to use reserve fuel while he searches for a fuel re-supply.

Figure 1:
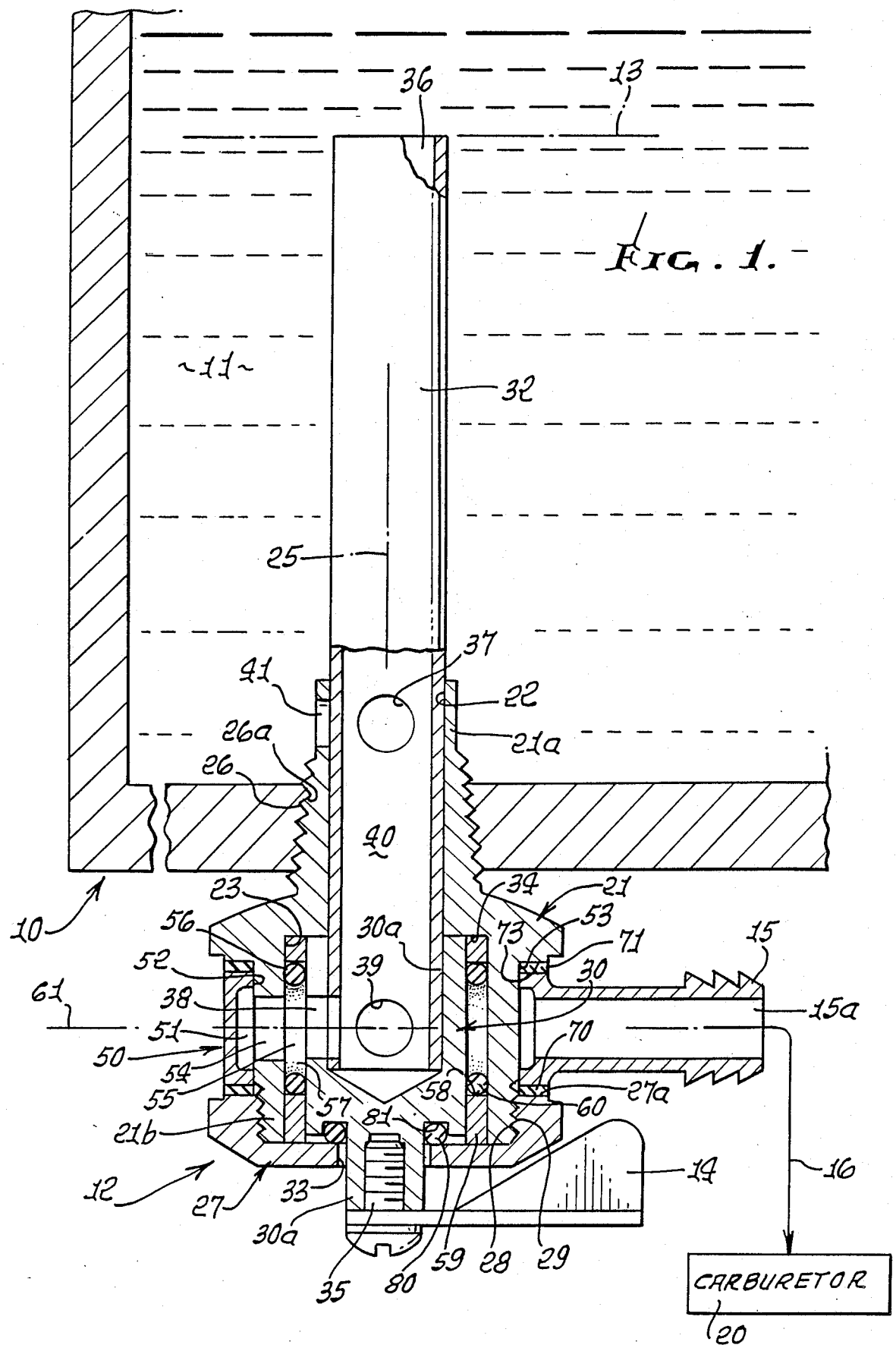
FIG. 1 is a vertical elevation, partly broken away, to show interior construction of a metering valve incorporating the invention.

Referring to FIG. 1, a tank 10 contains fluid, such as liquid fuel 11, to be delivered or metered to a destination, such as a carburetor 20 for an engine or a motorcycle. The fuel metering valve apparatus 12 is operatively connected between the tank 10 and the device 20, and in such a way that fuel delivery stops when the fuel supply drops to a reserve level such as indicated at 13, and only resumes when the operator adjusts the valve apparatus 12, as by rotation of a handle 14 to a pre-set "reserve flow" position. Such flows are also enabled, no matter what the selected orientation of the nozzle discharge 15a from the valve apparatus, whereby the nozzle 15 may be oriented in parallel with the motorcycle forward axis, or in some other way, so that the discharge flow line 16 is least exposed or obstructive, and also maximally safe.

The apparatus 12 includes body means, such as a metal body 21, which is tubular and defines cavity means, such as are defined by bore 22 and counterbore 23. Step shoulder 34 extends normal to α between 23 and 22, and the body defines an upright axis 25. Body tubular stem 21a projects upwardly and may be externally threaded at 26 for thread connection to the tank thread 26a. The open lower end of the body is closed by a cap 27, in the form of a tubular nut having internal threading 28 tightenable on thread 29 formed in body skirt 21b.

Rotor means is provided to control flow of fluid from the tank through the body, via porting in the rotor means. See for example cylindrical rotor 30 received in the cavity, i.e., counterbore 23, to seat upwardly against the step shoulder. The rotor means also includes a rotary tubular stem 32, the lowermost extent of which is attached to rotor 30, as by a press fit in rotor bore 30a. The tubular stem extends upwardly in body stem 26a, with rotary slidable fit therein. Rotation is imparted to the rotor by external handle 14 that connects to a reduced diameter rotor part 30a projecting downwardly through an opening 33 in the cap 27. See fastener 35 connecting the handle to the part 30a'.

Two inlets, 36 and 37, and two outlets, 38 and 39, are provided whereby porting 40 in the rotor communicates flow from the tank via one inlet (36 for example) and one outlet (38 for example) in rotor first position as shown in FIG. 1, and alternatively that porting 40 in the rotor communicates flow from the tank via the other inlet (37 for example) and the other outlet 39 in rotor second position (rotated 90° about axis 25 relative to the position seen in FIG. 1). Thus, in first position, as shown, flow enters at 36, passes downwardly via port 40 and outwardly at 38 to ultimately pass to the discharge nozzle 15 and to the carburetor; that flow continues until the fuel level in the tank drops to level 13, at which time flow ceases; and flow can be made to resume by 90° rotation of handle 14 about axis 25, bringing inlet 37 into exposure to the tank liquid, as via registration with a side opening 41 in body stem 21a (inlet 37 is blanked by that stem until it is rotated into registration with opening 41). Flow then passes downwardly at 40 to exit via outlet 39, which has now been rotated 90° into position for discharge to nozzle 15. Note that outlets 38 and 39 are at the same level, and offset 90°, on the rotor; and that inlets 36 and 37 are offset axially.

Figure 4:
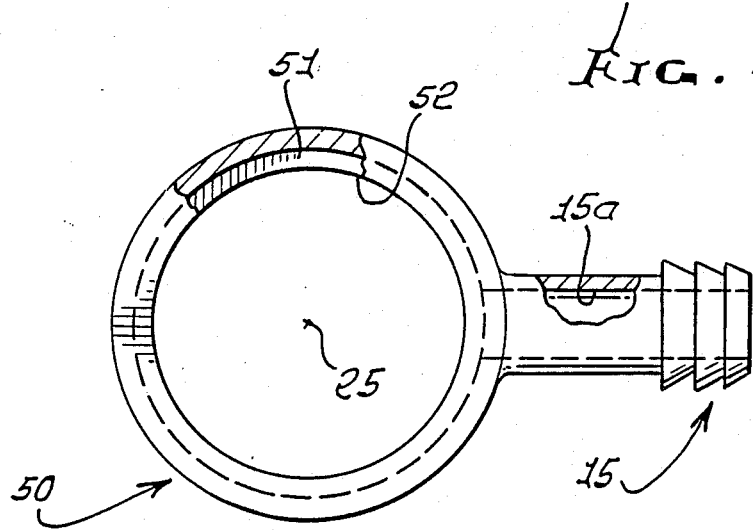
FIG. 4 is a closer view of a rotatable annular defining a plenum, and a discharge opening.
Figure 5:
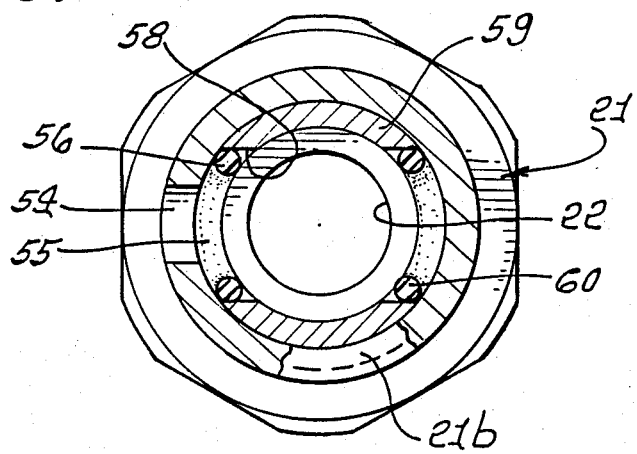
FIG. 5 is a plan view of a multi-function closure-keeper also shown in FIG. 1.

It is a feature of the invention that collector means is provided to extend about the rotor, and to provide the discharge, as for example opening 15a at the nozzle 15. That collector means is indicated at 50, and forms a plenum 51 that extends annularly about axis 25 and about the rotor, the plenum communicating with discharge opening 51. See FIG. 1 and FIG. 4. The annularly extending plenum is formed as a re-entrant recess sunk radially outwardly at the inner side or bore 52 of the collector. That bore fits slidably against the cylindrical outer surface 53 of the body 21, so that the ring-shaped collector is rotatable about axis 25 and about the rotor to an adjusted or selected position of the nozzle 15. The plenum, being annular, communicates with outlet 38 (or outlet 39) whatever the angular position of the nozzle. This is made possible by the fact that the plenum is exposed radially to one or the other of these outlets via a registered radial passage 54 through skirt 21b of body 21, and a port 55 formed by an O-ring 56 that fits in an annular space 57 (about axis 25) formed between skirt 21b and rotor 30, and within an aperture or apertures 58 formed transversely through a cylindrical sleeve 59 in space 57. A complementary O-ring 60 fits in opening 58 at the opposite side of the rotor. Such O-rings seal off between 30 and 21b and allow rotor rotation. Opening 58 is cylindrical about transverse axis 61 normal to axis 25. The two elastomeric O-rings 56 and 60 are each warped about axis 25, (see FIG. 5) and accordingly, the body means has a through passage 54 remaining in communication with the annular plenum as the annular means is adjustably rotated, the through passage selectively alignable with one of the outlets peripherally sealed in said first position of the rotor means, and selectively alignable with the other of said outlets peripherally sealed in the second position of said rotor means. The rings 56 and 60 in FIGS. 1 and 5 are located to extend partly about the rotor 30.

Means is provided to clamp the annular collector means 50 in selected position relative to the body means 21, after adjusted rotation of the collector means about axis 25. Cap 27 serves this purpose, and has an annular rim 27a that transmits clamping force upwardly to the collector rim, as the cap is rotated in a tightening direction on thread 29 to advance upwardly.

Seals 70 and 71 (annular about axis 25) are thereby clamped to seal off between the cap and collector, and between the collector and body annular shoulder 73, as the collector is immobilized. Such rotation of the cap about rotor port 30a enables non-interfering rotation of the handle 14 connected to port 30a, as required to select main or reserve fuel metering.

The warped O-rings tend to center the rotor for rotation about axis 25 and frictionally hold it in rotated position, due to slight clearance between the rotor and elements 21 and 59. See FIG. 5. The two O-rings also balance the rotation of the rotor; they then have multiple functions. Note also an elastomeric O-ring 80 received in a groove 81 in the bottom of the rotor and sealing off between the rotor and the inner facing top 27b of the cap 27. O-ring 80 extends about the opening 33.

Limiting of the rotor rotation at the end of its 90° rotary movement is achieved for example by a pin 90 carried by the rotor stem 32, and engageable against either of two offset shoulders 91 on the body part 21a. See FIG. 2.

A filter 95 may be employed at the upper end of 32, as seen in FIG. 3.

We claim:

1. In valve apparatus for controlling flow of fluid via one or the other of two inlets defined by said apparatus, and via one or the other of two outlets defined by said apparatus,
  (a) body means defining cavity means; and rotor means defining porting, and rotatable in the cavity means between a first position in which porting in the rotor means communicates between one of said inlets and at least one of said outlets, and a second position in which porting in the rotor means communicates between the other of said inlets and the other of said outlets, there being O-ring means sealing off between said body means and rotor means and extending partly about the rotor means.
  (b) and collector means extending about the rotor means and having a substantially annular plenum with a discharge opening, the collector means adjustably rotatable about the rotor means to angularly orient said discharge opening.

(c) the body means having a through passage remaining in communication with said substantially annular plenum as said collector means is adjustably rotated, said through passage selectively alignable with one of said outlets in said first position of the rotor means, and selectively alignable with the other of said outlets in the second position of said rotor means.

2. The apparatus of claim 1 wherein said outlets are on said rotor means.

3. The apparatus of claim 1 wherein said rotor means includes an axially elongated tubular stem on which said two inlets are located in offset relation axially therealong.

4. The apparatus of claim 3 wherein said stem extends upright, and there being a tank for said fluid into which said tubular stem extends.

5. The apparatus of claim 1 wherein said rotary means defines an axis of rotation, said two outlets located in approximately 90° offset relation, about said axis, to be selectively registrable with said through passage.

6. The apparatus of claim 1 including means to clamp said collector means in position relative to said body means, after adjusted rotation of the collector means about an axis of rotation defined by said rotor means.

7. The apparatus of claim 6 including seal means for sealing off between the body means and collector means, thereby to prevent fluid leakage from the plenum.

8. The apparatus of claim 1 including a nozzle defining said discharge opening, and to which flexible tubing is connectible.

9. In valve apparatus for controlling flow of fluid via one or the other of two inlets defined by said apparatus, and via one or the other of two outlets defined by said apparatus, (a) body means defining cavity means, and rotor means defining porting, and rotatable in the cavity means between a first position in which porting in the rotor means communicates between one of said inlets and at least one of said outlets, and a second position in which porting in the rotor means communicates between the other of said inlets and the other of said outlets, there being O-ring means sealing off between said body means and rotor means and extending partly about the rotor means, (b) and collector means extending about the rotor means and having a substantially annular plenum with a discharge opening, the collector means adjustably rotatable about the rotor means to angularly orient said discharge opening, (c) the body means having a through passage remaining in communication with said substantially annular plenum as said collector means is adjustably rotated, said through passages selectively alignable with one of said outlets in said first position of the rotor means, and selectively alignable with the other of said outlets in the second position of said rotor means, (d) there being warped O-ring means sealing off between said body means and said rotor means.

10. The apparatus of claim 9 wherein said warped O-ring means includes a first warped O-ring engaging a bore defined by said body means, adjacent said through passage, said first warped O-ring extending about a transverse axis defined by said through passage, said transverse axis extending transversely relative to an axis of rotation defined by said rotor means, said bore extending about said axis of rotation.

11. The apparatus of claim 10 wherein said warped O-ring means includes a second warped O-ring engaging said bore, said two O-rings located at opposite sides, respectively, of said axis of rotation.

12. The apparatus of claim 11 wherein said rotary means includes an elongated tube, and a cap at one end of the tube, said one end of the tube and the cap being integral of defining said two outlets.

13. The apparatus of claim 12 including a sleeve inserted between said cap and said bore, the sleeve retained to said bore, the sleeve defining through apertures in alignment with said transverse axis, the warped O-rings respectively received in said two apertures.

14. The apparatus of claim 1 including a handle operatively connected to he rotor means to rotate same between said positions, and a clamp carried by said apparatus to adjustably clamp the said annular means in selected rotary position on and relative to the body means.

15. The apparatus of claim 14 wherein the clamp includes an annular nut having thread connection to the body means, and said handle is connected to a part of said rotary means which projects through the nut.

16. The apparatus of claim 14 including step shoulder means on the rotary means and body means to limit rotation of said rotor means when the latter arrives at said first and second positions.

* * * * *